Patented May 27, 1924.

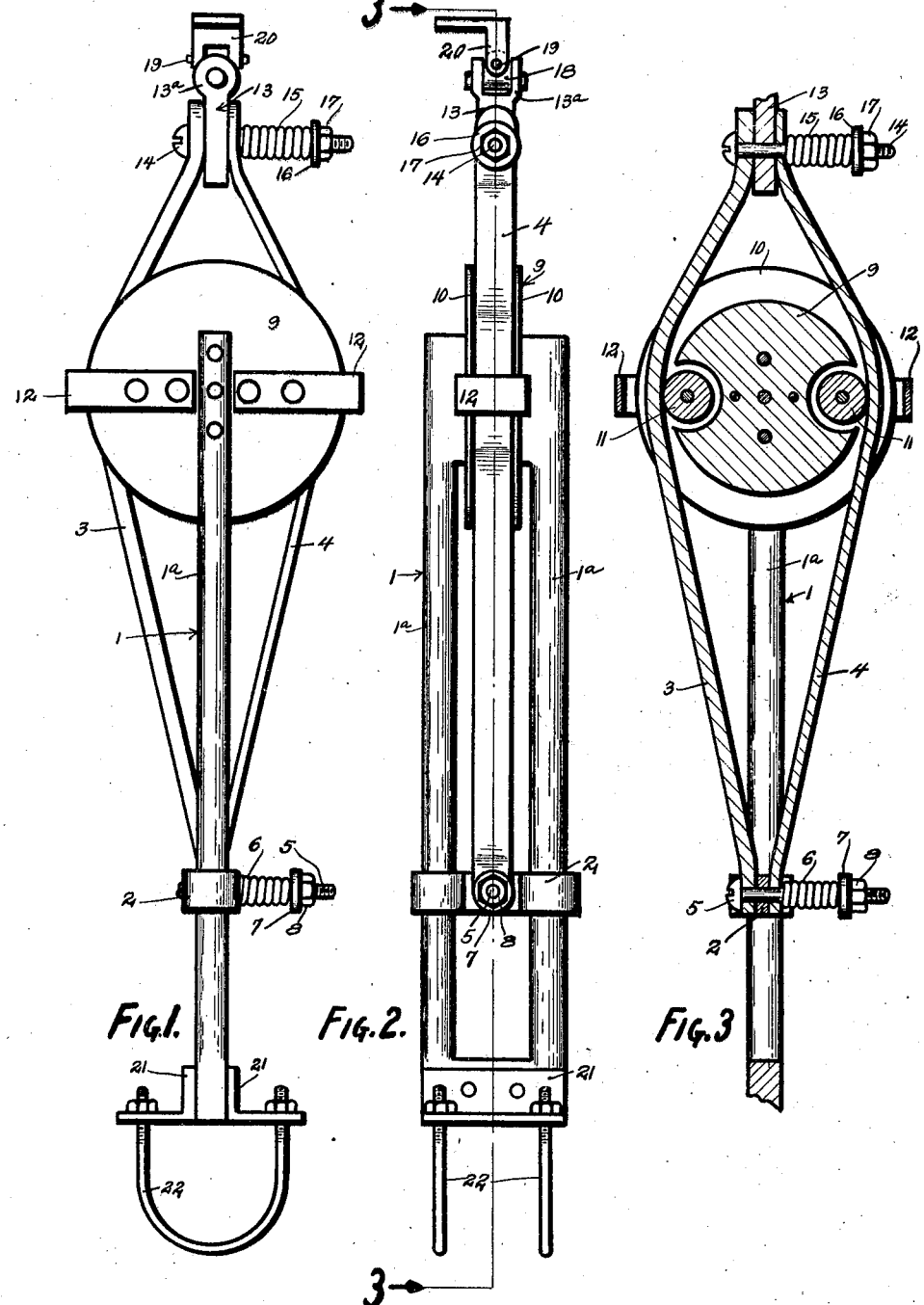

1,495,932

UNITED STATES PATENT OFFICE.

HUGH A. STITT, OF VANDERGRIFT, PENNSYLVANIA.

SNUBBER.

Application filed October 17, 1923. Serial No. 669,165.

*To all whom it may concern:*

Be it known that I, HUGH A. STITT, a citizen of the United States, residing at Vandergrift, in the county of Westmoreland and State of Pennsylvania, have invented new and useful Improvements in Snubbers, of which the following is a specification.

This invention relates to snubbers, and more particularly to a snubber intended for use in connection with automobiles.

One of the main objects of the invention is to provide a snubber of simple construction and operation which may be readily produced and applied at small cost. A further object is to provide a snubber which will act to effectually cushion rebound of the automobile body in either direction. Further objects will appear from the detail description.

In the drawings;

Figure 1 is a side view of the snubber;

Figure 2 is a front view;

Figure 3 is a fragmentary section taken substantially on line 3—3 of Fig. 2.

The snubber includes a frame 1 of substantially elongated U-shape. A yoke 2 is slidably mounted on arms 1ª of frame 1 and leaf springs 3 and 4 are secured, at their lower ends, to yoke 2 by means of a securing bolt 5 which passes through the yoke and the ends of the springs. The bolt 5 projects beyond spring 4 and receives an expansion coil spring 6 mounted about the bolt and confined between spring 4 and a washer 7 held against outward movement on the bolt by a nut 8 threaded on the bolt beyond the washer.

A disc 9 is secured between the upper ends of arms 1ª of frame 1 and is provided, at each side, with a peripheral extension or flange 10. Springs 3 and 4 extend about disc 9 between flanges 10 and bear upon anti-friction rollers 11 carried by the disc. Retaining straps or keepers 12 are secured to disc 9 and extend across springs 3 and 4 so as to prevent casual displacement of either of the springs from between flanges 10. Springs 3 and 4 are secured at their upper ends to a block 13 by means of a bolt 14 which passes through the springs and the block, the block being positioned between the ends of the springs. An expansion spring 15 similar to spring 6 is mounted about bolt 14 and is confined between the upper end of spring 4 and a washer 16 with which contacts a nut 17 threaded onto bolt 14.

Block 13 is provided, at its upper end, with a fork 13ª in which is pivoted a connecting block 18 to which is pivoted at 19 an angle bracket 20, the axis of the hinge or pivot of bracket 20 being disposed at right angles to the pivotal axis of connecting block 18, thus providing a universal connection. Angle brackets 21 are secured to the opposite sides of the lower portion of frame 1 and are adapted to receive U-bolts 22 by means of which the frame can be secured to the axle or axle housing of an automobile. In practice the frame is secured to the axle or axle housing and bracket 20 is secured to the body or the chassis of the automobile. Upon relative vertical movement of the chassis and the axle, yoke 2 will be moved longitudinally of arms 1ª of frame 1, this movement of the yoke being opposed or retarded by the action of the spacing member or disc 9 which acts to force springs 3 and 4 apart, this movement apart of the springs being resisted by the inherent resiliency of the springs themselves and also by the expansion springs 6 and 15. This action will take place upon relative movement of yoke 2 and spacing member 9 in either direction so that the device acts as a shock absorber and snubber to effectually prevent rebound of the automobile body. The nuts 8 and 17 provide convenient means whereby the springs 6 and 15 may be compressed to adjust the resiliency or cushioning effect of the device.

Preferably the snubber is attached to the automobile in the manner described, though it may be attached in any suitable or preferred manner, as will be understood. As above indicated, changes in details of construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In a snubber, a frame, a yoke slidably mounted on the frame, spacing means carried by the frame, and springs secured at one end to the yoke and passing about said spacing means, said springs being secured together at their other end.

2. In a snubber, a frame, a yoke slidably mounted on the frame, spacing means carried by the frame, springs secured at one end to the yoke, said springs being movable toward and away from each other and being secured together at their other end, and resilient means for forcing the springs toward each other.

3. In a snubber, a frame, a yoke slidably mounted on the frame, spacing means carried by the frame, springs secured at one end to the yoke, said springs being movable toward and away from each other and being secured together at their other end, and adjustable resilient means for forcing the springs toward each other.

4. In a snubber, a frame, a yoke slidably mounted on the frame, a spacing member carried by the frame, flat springs secured at one end to the yoke and passing about the spacing member, means for securing the springs to the yoke and for forcing the springs toward each other while permitting them to move away from each other, and means for securing the springs together at their other end, the last mentioned means acting to force the springs toward each other while permitting movement of the springs away from each other.

5. In a snubber, a frame, a yoke slidably mounted on the frame, a spacing member carried by the frame, flat springs extending about the spacing member at opposite sides thereof, means for securing the springs to the yoke at one end and for forcing the springs toward each other, said means permitting spreading apart of the springs, and means for securing the springs together at the other end thereof and for permitting spreading apart of the springs.

6. In a snubber, a frame, a yoke slidably mounted on the frame, a spacing member carried by the frame, flat springs extending about the spacing member at opposite sides thereof, a bolt passing through the springs at one end thereof and through the yoke, the springs being at opposite sides of the yoke, an abutment member secured on the bolt, an expansion spring mounted about the bolt and confined between said abutment member and the adjacent spring, a bolt inserted through the springs at the other end thereof, an abutment member on the bolt, and an expansion spring mounted about the second mentioned bolt and confined between the abutment member and one of the flat springs.

In testimony whereof I affix my signature.

HUGH A. STITT.